(12) United States Patent
Kuempel (10) Patent No.: US 11,497,343 B2
(45) Date of Patent: Nov. 15, 2022

(54) BEVERAGE PRESS AND PRESSURE-ACTIVATED FILTER ASSEMBLY

(71) Applicant: Blossom Coffee Inc., Brisbane, CA (US)

(72) Inventor: Jeremy Kuempel, Brisbane, CA (US)

(73) Assignee: Blossom Coffee, Inc., San Francisco, CA (US)

(*) Notice: Subject to any disclaimer, the term of this patent is extended or adjusted under 35 U.S.C. 154(b) by 207 days.

(21) Appl. No.: 16/100,204

(22) Filed: Aug. 10, 2018

(65) Prior Publication Data

US 2019/0021541 A1 Jan. 24, 2019

Related U.S. Application Data

(60) Provisional application No. 62/536,174, filed on Jul. 24, 2017.

(51) Int. Cl.
*A47J 31/38* (2006.01)
*A47J 31/06* (2006.01)
(Continued)

(52) U.S. Cl.
CPC .......... *A47J 31/38* (2013.01); *A47J 31/0605* (2013.01); *A47J 31/0642* (2013.01); *A47J 31/36* (2013.01); *A47J 31/446* (2013.01)

(58) Field of Classification Search
CPC .. A47J 31/36; A47J 31/34; A47J 31/24; A47J 31/0605; A47J 31/0642; A47J 31/0663; A47J 31/0615; A47J 31/38
(Continued)

(56) References Cited

U.S. PATENT DOCUMENTS 4,921,712 A * 5/1990 Malmquist ............ A47J 31/057
426/110
6,571,686 B1 * 6/2003 Riley .................... A47J 31/057
99/299
(Continued)

FOREIGN PATENT DOCUMENTS

DE 19711025 C1 * 5/1998 .......... A47J 31/0684
EP 0459323 A2 * 12/1991 .......... A47J 31/0663
(Continued)

OTHER PUBLICATIONS

Kickstarter Website for Cafflano portable espresso maker, https://www.kickstarter.com/projects/1555081857/cafflano-kompresso-a-portable-authentic-espresso-m (accessed Nov. 27, 2018).
(Continued)

*Primary Examiner* — Reginald Alexander
(74) *Attorney, Agent, or Firm* — Cognition IP, P.C.; Edward Steakley; Rajesh Fotedar (57) ABSTRACT

A beverage press is described which includes a pressure-activated valve in a pressurized brewing chamber. The pressure-activated valve opens when pressure within the chamber rises above a cracking pressure. A filter in the brewing chamber may filter out solids while passing liquids out of the pressure-activated valve. In some embodiments, a high-pressure beverage filter assembly is disclosed which is configured to mate to a beverage press. Also disclosed is an integrated beverage press incorporating a high-pressure beverage filter assembly and features of a beverage press in a single unit.

14 Claims, 4 Drawing Sheets

(51) Int. Cl.
*A47J 31/36* (2006.01)
*A47J 31/44* (2006.01)

(58) Field of Classification Search
USPC .............................. 99/297, 302 P, 322, 299
See application file for complete search history.

(56) References Cited

U.S. PATENT DOCUMENTS

| | | | |
|---|---|---|---|
| 6,711,988 B1 * | 3/2004 | Eugster | A47J 31/36 99/283 |
| 7,849,784 B2 | 12/2010 | Adler | |
| 8,180,204 B2 * | 5/2012 | Glucksman | A47J 31/4407 392/328 |
| 8,663,724 B1 * | 3/2014 | Banasik | A47J 31/0631 426/433 |
| 9,932,168 B2 * | 4/2018 | Hansen | B65D 85/8043 |

FOREIGN PATENT DOCUMENTS

| | | | | |
|---|---|---|---|---|
| EP | 0919171 A1 * | 6/1999 | .......... | A47J 31/0663 |
| EP | 1319357 A2 * | 6/2003 | .......... | A47J 31/0605 |
| WO | WO-2012004430 A1 * | 1/2012 | .............. | A47J 31/36 |

OTHER PUBLICATIONS

Kickstarter Website for Simpresso portable espresso machine, https://www.kickstarter.com/projects/simposh/simpresso-enjoy-espresso-beverages-anytime-anywher-1 (accessed Nov. 27, 2018).
AeroPress Coffee Maker website, https://aeropressinc.com/ (accessed Nov. 27, 2018).
Coffee & Espresso Maker Fast Filer Coffee Machine, https://www.ebay.com/itm/Coffee-Espresso-Maker-Aero-Press-Fast-Filter-Coffee-Machine-/302348428423?hash=item46655ee487%3Ag%3A4t4AAOSwCkZZP7Pq&_trkparms=pageci%253Ad36374a2-6139-11e7-8057-74dbd180cd51%257Cparentrq%253A10fdf2c815d0aa4766913022fff13e87%257Ciid%253A11 (accessed Nov. 27, 2018).

* cited by examiner

BEVERAGE PRESS AND PRESSURE-ACTIVATED FILTER ASSEMBLY

CROSS-REFERENCE TO RELATED APPLICATIONS

This application claims the benefit of U.S. Provisional Application No. 62/536,174, filed Jul. 24, 2017, the entire contents of which are incorporated herein by reference.

FIELD OF INVENTION

The present invention relates generally to beverage makers and more particularly to beverage press beverage makers.

BACKGROUND

A coffee or tea filtering press includes a hollow cylinder having top and bottom openings, a perforated removable cap which encloses the bottom opening, a removable piston which is inserted into said top opening and pressed downward to force liquid in the cylinder through the perforated cap, and a support to hold the press above the mouth of an open vessel.

SUMMARY

Some embodiments relate to a cap including a filter and a pressure-activated valve that is dimensioned and configured to mate to a preexisting beverage press. The brewing pressure of a beverage press may be substantially increased by the addition of a pressurized filter cap according to these embodiments. For example, a beverage press fitted with a high-pressure beverage filter assembly may yield 9-26% higher pressure compared to a beverage press without a high-pressure beverage filter assembly. This change in pressure significantly affects the resultant beverage, creating new brewing possibilities for existing equipment.

In some embodiments, a high-pressure beverage filter assembly is disclosed which is configured to mate to a beverage press. Also disclosed is an integrated beverage press incorporating a high-pressure beverage filter assembly and features of a beverage press in a single unit.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

FIG. 1 illustrates a high-pressure beverage filter assembly 100 according to an embodiment. The high-pressure beverage filter assembly may be used for brewing any kind of infusible beverage such as but not limited to coffee or tea. FIGS. 1A-D each illustrate a different view of the same embodiment. High-pressure beverage filter assembly 100 may be configured to mate to a piston-operated beverage press such as the AEROPRESS® COFFEE MAKER by AEROPRESS, INC., for example. In some embodiments, a pressurized filter cap may attach to a beverage press by a threaded connector, magnetic connector, hinge and latch connector, a bayonet connector, or any other similar mechanical removable connector. For example, some embodiments relate to a cap configured to mate with the AEROPRESS® COFFEE MAKER by AEROPRESS, INC. In these embodiments, the flange of the cap includes a male bayonet connector that mates with the female bayonet connector present on the AEROPRESS® COFFEE MAKER by AEROPRESS, INC.

Figure 1A:
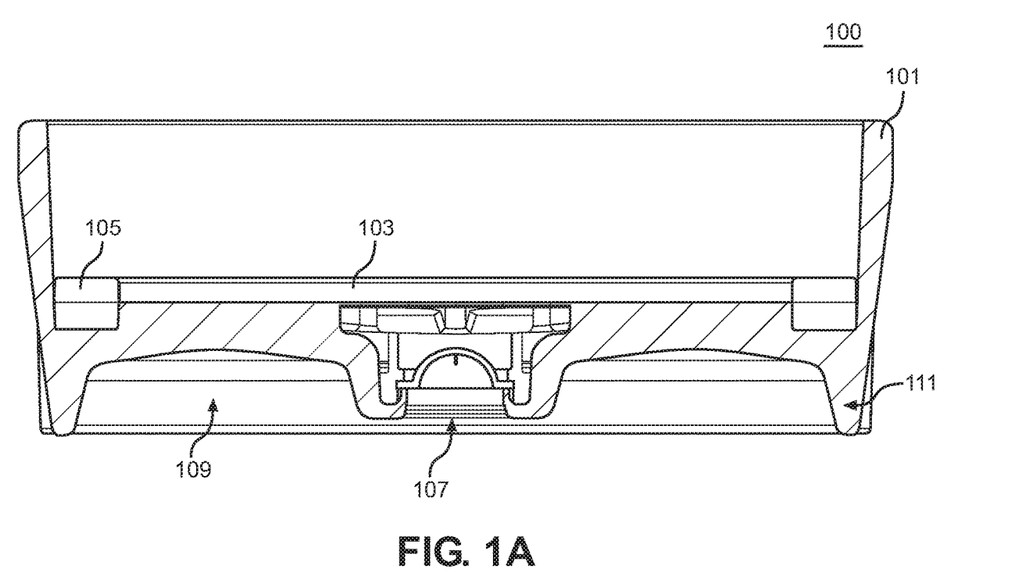
FIG. 1A illustrates a cross-sectional view of a high-pressure beverage filter assembly according to an embodiment.

FIG. 1A illustrates a cross-sectional view of a high-pressure beverage filter assembly according to an embodiment. In this view, body 101 of a high-pressure beverage filter assembly holds a pressure-activated valve 107 and a filter 103. Pressurized liquids above filter 103 are forced through filter 103 and then through pressure-activated valve 107. Gasket 105 produces a seal between filter 103 and body 101 such that the pressurized liquid in the pressurized brewing chamber may not bypass the filter. Pressure-activated valve 107 is configured to remain closed while the pressure in the hollow cylinder is below a cracking pressure, and open when the pressure in the hollow cylinder rises above the cracking pressure. This ensures that a minimum pressure is attained before any liquid is able to be dispensed.

In the embodiment illustrated in FIG. 1, pressure-activated valve 107 is a self-sealing elastomeric dome valve. However, the pressure-activated valve may be any kind of pressure-activated valve, such as a duckbill valve, a ball check valve, or a bi-stable pressure valve. In some embodiments, valve 107 may be a manually-activated valve that is manually opened when the pressure inside the pressurized chamber is at an appropriate pressure. In some embodiments, valve 107 may be activated by other means, such as contact with the vessel underneath. The pressure activated valve may also be a "pop gun" style, where, upon reaching sufficient internal pressure, a sealing element such as a "cork" pops out of body 101 allowing the flow of liquid.

For any type of pressure-activated valve 107, the diameter of the valve may be selected so as to balance the flow rate of beverage out of the pressurized container with the pressure provided. For example, too large of a valve would release too much pressure too fast and would not achieve a steady pressurized stream. Conversely, a valve that is too small in diameter would provide too much resistance for the pressurization mechanism. For any particular implementation, one skilled in the art may select a valve diameter based on, among other factors, pressurization technique, liquid volume, and liquid viscosity to achieve desired flow rates and pressures.

In some embodiments, a self-sealing elastomeric dome valve forms a nozzle when open. The nozzle formed by the self-sealing elastomeric dome valve directs liquid contents in a stream into the vessel below at a high pressure. This nozzle creates turbulence in the liquid stream that may mix air into the beverage as it travels through the nozzle formed by the open elastomeric dome valve. In some embodiments, the pressure of the liquid stream and the elastomeric qualities of the elastomeric dome valve may resonate so as to create a "fluttering" effect of the elastomeric dome valve which further froths the beverage as it leaves the pressurized container. The resultant pressurized stream also mixes air with the beverage as it strikes the liquid in the beverage vessel below. The combination of these two effects creates a frothy quality to the resultant beverage. In coffee beverages, for example, this froth can be referred to as crema and may be highly desirable for certain styles of brewing.

Pressure-activated valve 107 is inserted into body 101. Body 101 may be made of materials of sufficient strength and rigidity to withstand the pressures contained within the pressurized brewing container. For example, in some embodiments the portion of the high-pressure beverage filter assembly that holds the seals around the filter must be sufficiently rigid to sufficiently maintain form under pressure so as to maintain the seals around the filter. The relevant pressures include not only the pressure of the contents of the pressurized brewing chamber, but also the forces used by any pressurization mechanism to produce those pressures. For example, in some embodiments a plunger is manually pressed downward to create pressure in the pressurized brewing chamber, and these forces in turn press downward on some other object below such as a beverage vessel. The materials of the high-pressure beverage filter assembly are therefore selected to as to withstand these pressures as well.

Various materials may be used for body 101. For example, the body of the high-pressure beverage filter assembly may be made of polypropylene, opaque plastic, clear plastic, anodized aluminum, stainless steel, ceramic, brass, hard rubber, or the like. Different portions of a beverage press incorporating a high-pressure beverage filter assembly may be made of different materials, based on the particular pressures on each portion. For example, the portion holding the filter and pressure-activated valve may be made of a first material, while the remaining portions of the body including the walls of the pressurized brewing vessel may be made of another type of material.

In some embodiments, a beverage press may be made of plastic materials such as polypropylene. In some embodiments, various additives may be added to the polypropylene to increase stiffness, such as glass fiber. For example, the addition of approximately 30% glass fill to the polypropylene material may increase stiffness of the beverage press. In some embodiments, the polypropylene may be heat treated to increase stiffness. These techniques, either alone or in combination with each other or other strengthening or stiffening techniques may be used to produce a beverage press of sufficient strength, stiffness, and rigidity.

In some embodiments, a hand-operated plunger is used to increase pressure in a pressurized brewing chamber above filter 103. In some embodiments, it may be preferred for the hand operated plunger to have a non-constant diameter such the upper portion, in which the plunger forms an air tight seal, is smaller than the lower portion where the coffee and filter 103 are held. This smaller upper diameter increases the pressure exerted on the coffee and filter 103 for the same force applied, when compared to a constant diameter cylinder. Increased pressure is useful for certain methods of coffee brewing, such as making espresso. Other methods or mechanisms for producing pressure inside of a pressurized brewing chamber may also be used. For example, a mechanical spring mechanism may be provided to provide downforce on a plunger in place of manual manipulation. Similarly, a screw press may be used to provide this downward force as well. In some embodiments, pressure may be generated from other sources as well. For example, compressed gasses may be used to increase pressure in the pressurized brewing chamber. In an embodiment, a pressurized $CO_2$ cartridge may be used. Similarly, a contained heated gas such as water vapor may similarly provide pressure to the pressurized brewing chamber.

Beverage filter assembly 100 includes a support 111 to hold it on the mouth of an open vessel. Support 111 may be designed to allow the high-pressure beverage filter assembly 100 to fit on most espresso cups or inside of most coffee mugs, carafes, and Mason jars. The bottom side of high-pressure beverage filter assembly 100 is also shaped to permit venting of air out of a vessel when support 111 is fitted on a beverage container below. In an embodiment, the bottom side of high-pressure beverage filter assembly 100 includes external scallops or ridges 109 on the portion that contacts the lip of a beverage container to allow venting. These scallops or ridges may also be designed to allow the press to fit on most espresso cups or inside of most coffee mugs, carafes, and Mason jars.

Figure 1B:
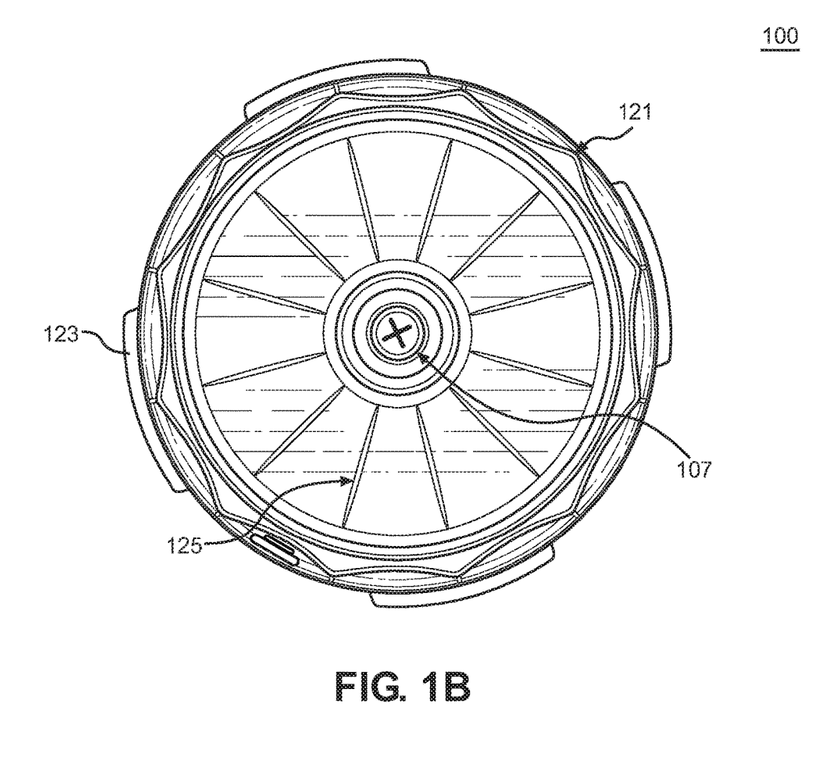
FIG. 1B illustrates a bottom view of a high-pressure beverage filter assembly according to an embodiment.

FIG. 1B illustrates a bottom view of high-pressure beverage filter assembly 100 according to an embodiment. FIG. 1B provides a view of high-pressure beverage filter assembly 100 from a bottom-up perspective relative to FIG. 1A. In addition to those elements described in connection with FIG. 1A above, FIG. 2B illustrates edge features 121. Edge features 121 may include scallops or ridges to help a user grip the body of the high-pressure beverage filter assembly 100 during use.

Also illustrated in FIG. 1B is a bayonet connector 123 for attaching the high-pressure beverage filter assembly 100 to a beverage press. For example, bayonet connector 123 may be configured to mate with the AEROPRESS® COFFEE MAKER by AEROPRESS, INC. Any other appropriate connector may be used to attach the high-pressure beverage filter assembly 100 to any other beverage press. In some embodiments, a pressurized filter cap may attach to a beverage press by a threaded connector, magnetic connector, hinge and latch connector, a bayonet connector, or any other similar mechanical removable connector In some embodiments, the pressurized filter cap may comprise two parts, one of which may remain attached to a beverage press while the other part is removed. In such a configuration, a user may easily alternate between using the unmodified beverage press and using the beverage press combined with the pressurized filter cap. For example, in an embodiment, a first portion of a pressurized filter cap may mate with a beverage press such as an AEROPRESS® COFFEE MAKER by AEROPRESS, INC by a bayonet connector. This first portion may be configured so as to substantially not interfere with the normal operation of the beverage press. A second portion of the pressurized filter cap may then selectively attach to the first portion. This second portion of the pressurized filter cap may include a filter and a pressurized valve such as described in various embodiments in this disclosure.

Figure 1C:
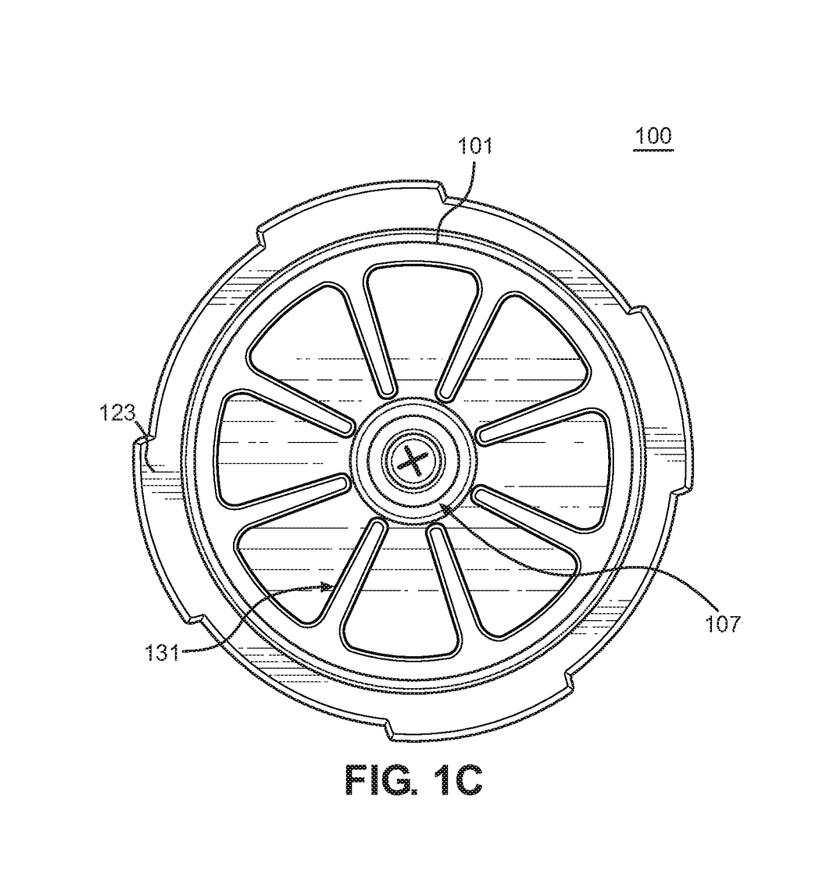
FIG. 1C illustrates a top view of a high-pressure beverage filter assembly according to an embodiment.

FIG. 1C illustrates a top view of a high-pressure beverage filter assembly according to an embodiment. FIG. 1C provides a view of high-pressure beverage filter assembly 100 from a top-down perspective relative to FIG. 1A. In this view, pressure-activated valve 107 and connector 123 as discussed above in relation to other views of high-pressure beverage filter assembly 100 are visible. In addition, FIG.

1C illustrates flow channels 131. Flow channels 131 support a filter (not pictured in FIG. 1C) placed in high-pressure beverage filter assembly 100.

In some embodiments, a filter may be placed directly above the pressurized valve such that there is no significant distance between the filter and the valve. In some embodiments, the filter is placed at a set distance from the pressurized valve, effectively dividing the pressurized brewing chamber into two sections. In the first section, a pressurization mechanism builds pressure. In the second section, a pressurize-activated valve selectively releases pressure from the pressurized brewing chamber. The two sections are divided by the filter, such that liquid is forced through the filter from the first section to the second section, and subsequently out of the pressurized brewing chamber via the pressurize-activated valve. In these embodiments, then, the behavior of a beverage press may be characterized by, among other factors, the volume of the first section, the volume of the second section, the pressures created in the first section by a pressurization mechanism, the viscosity of the liquid in the pressurized brewing chamber, the area of the filter, the cracking pressure and flow rate of the pressure-activated valve, and the properties of the filter. These various parameters may be selected by one of skill in the art for any particular implementation. For example, in an embodiment, the cracking pressure of the pressure activated valve may be in the range of 0.04-1.7 psi.

In FIG. 1C, flow channels 131 are included to maintain a desired flow rate and pattern through the filter and out of the pressure-activated valve. In particular, flow channels 131 may be incorporated into the inner surface of the second portion of the pressurized brewing chamber that, among other effects, maintain a set distance between a filter and the top of body 101. The height of these flow channels 131 determines the volume of the second portion of pressurized brewing chamber. The flow channels 131 may also be designed to direct flow of liquid and selectively introduce turbulence in the second portion of the pressurized brewing chamber. In some embodiments, flow channels 131 may be comprised of a series of radial ridges. Other flow channel configurations may be used as well, such as a pin bed design, a plate with holes, spiral ridges, or even incorporated into the filter shape.

In some embodiments, the height of flow channels 131 is chosen based on the surface tension of the liquid in the pressurized brewing chamber. If the channels are too tall, air pockets may be introduced which may produce inconsistent flow through the pressure-activated valve. If the channels are too short, then overall flow may be inhibited to an unacceptable degree. For example, in the embodiment illustrated in FIG. 1, flow channels 131 consist of a series of radial ridges of approximately 0.5-3.0 millimeters in height. This configuration and dimension of flow channel may be particularly well suited to coffee brewing. In alternative embodiments, the radial ridges may be approximately 1.0-1.8 millimeters in height.

Figure 1D:
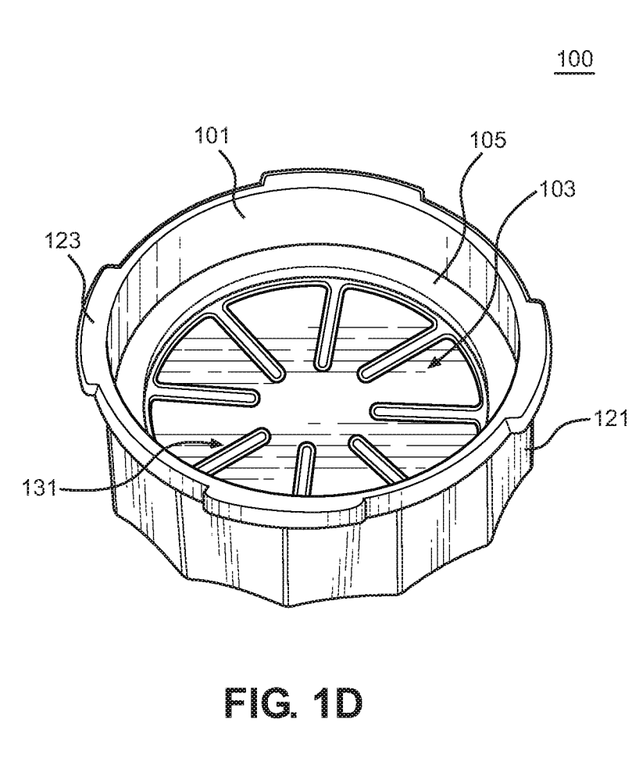
FIG. 1D illustrates a perspective top view of a high-pressure beverage filter assembly according to an embodiment.

FIG. 1D illustrates a perspective top view of a high-pressure beverage filter assembly according to an embodiment. FIG. 1D is a similar view as FIG. 1C but includes filter 103 and gasket 105 placed in body 101. In an embodiment, filter 103 is a metal filter that may be washed and reused for multiple brewing uses. In one example, the metal filter may be an 80 micron etched fine metal filter. In another example, the metal filter may have holes of approximately 0.1-0.12 millimeters in diameter. The total open area of filter 103, the size of the filter holes, and the gauge of the metal used to make the filter may be chosen for any particular implementation based on the intended use. For example, varying filter parameters may be more or less appropriate for any particular style or type of beverage. In particular, parameters for a filter for coffee brewing may be influenced by the grind of the coffee used and the intended coffee style. For example, a filter with larger diameter holes may be more appropriate for a French press style of brewing, while a comparatively finer filter may be selected for an espresso style of brewing.

Other types of filters may be used instead of a metal filter such as described above. For example, various embodiments of filter 103 may include a cloth filter, a sintered ceramic filter, a sintered metal filter, a sintered glass filter, a metal mesh filter, or a paper filter. Additionally, the filter plane may be used for purposes other than filtration, such as providing a support plate for a paper filter. One skilled in the art may select the appropriate filter type and parameters for a particular implementation.

In FIG. 1, a gasket 105 is included to produce a seal between filter 103 and body 101 such that the pressurized liquid in the pressurized brewing chamber may not bypass the filter. In an embodiment, a rubber gasket 105 may be over-molded around the filter 103. In other embodiments, a series of rubber O-rings may be placed above and below the filter. Other shapes of gasket may be used instead of flat rings, such as but not limited to a tapered gasket, a gasket with a groove that receives the filter, or a gasket that is outside of wall of the pressurize beverage press that constricts when the cap is tightened. In an embodiment, a gasket made of EPDM plastic may be molded into body 103.

Figure 2:
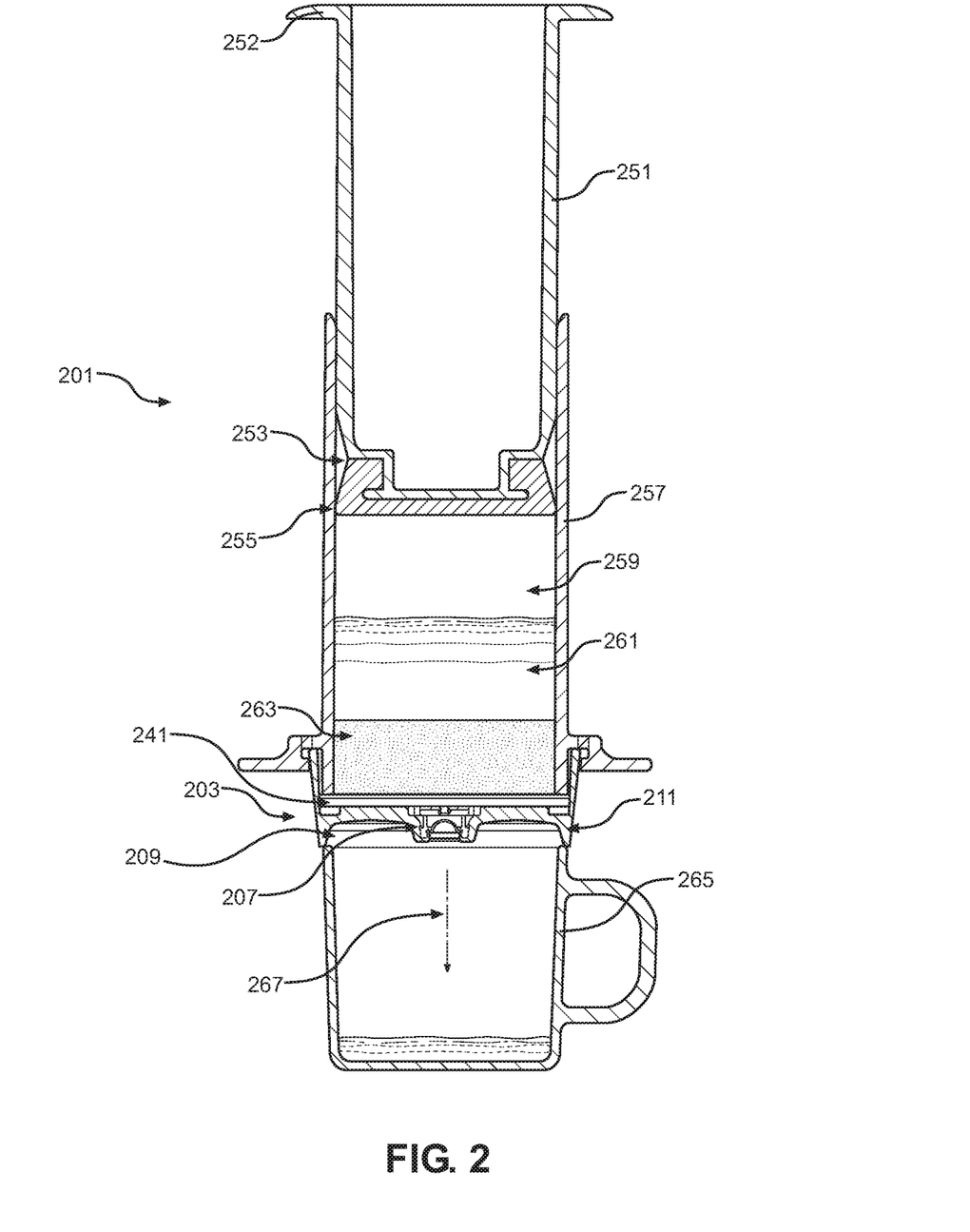
FIG. 2 illustrates a coffee or tea press mated to a high-pressure beverage filter assembly according to an embodiment.

FIG. 2 illustrates a coffee or tea press 201 mated to a high-pressure beverage filter assembly cap 203 according to an embodiment. The combination of a coffee or tea press 201 and a high-pressure beverage filter assembly 203 may be referred to collectively as high pressure press 200. For example, coffee or tea press 201 may be the AEROPRESS® COFFEE MAKER by AEROPRESS, INC. Coffee or tea press 201 includes a hollow cylinder 257 having top and bottom openings. A removable high-pressure beverage filter assembly cap 203 encloses the bottom opening.

Removable high-pressure beverage filter assembly cap 203 includes a pressure-activated valve 207. Pressure-activated valve 207 is configured to remain closed while the pressure in the hollow cylinder is below a cracking pressure, and open when the pressure in the hollow cylinder rises above the cracking pressure. A removable piston 251 is inserted into the top opening and pressed downward to force liquid 261 in the cylinder through pressure-activated valve 207 in removable high-pressure beverage filter assembly cap 203. A filter 241 may be captured between removable high-pressure beverage filter assembly cap 203 and cylinder 257 to strain particles from the liquid.

High-pressure beverage filter assembly cap 203 has a support 211 to hold it on the mouth of an open vessel 265. The support 211 may be shaped to permit venting of air out of open vessel 265 when the press is resting on top of the vessel and liquid is entering the vessel during brewing. In an embodiment, the support 211 includes external scallops or ridges 209 on the portion that contacts vessel 265. These scallops or ridges 209 may also be designed to allow the press to fit on most espresso cups or inside of most coffee mugs, carafes, and Mason jars.

In operation, press 200 is placed on an open vessel 265. Ground coffee or tea 263 is put into the cylinder 257. Hot water 261 is added, and the mixture is stirred. Then, piston 251 is inserted into the top opening and pressed downward to force the liquid 261 through filter 241, then through pressure-activated valve 207 and into vessel 265 as high velocity stream 267. The piston pressurizes the air 259, above the liquid and it is this pressurized air which forces the liquid 261 through ground coffee or tea 263, filter 241, and out pressure-activated valve 207. After the liquid is expelled, the press 200 is then lifted off vessel 265 and the high-pressure beverage filter assembly cap 203 may be removed from coffee or tea press 201.

Finally, piston 251 is pressed farther to eject the spent puck 263 of compressed coffee or tea into a waste receptacle. The piston 251 is capped with a flexible seal 253 to engage the inside of the cylinder. The seal preferably has its maximum diameter 255 at its lowest point in order to wipe clean the inside of the cylinder when the maximum diameter is pushed fully through the cylinder with the cap removed during ejection of the spent puck.

The piston 251 has a stop 252 which limits the maximum travel of the piston but permits the maximum diameter 255 of the seal to extend beyond the bottom opening of the cylinder with the cap removed to eject the spent puck.

In an embodiment, high-pressure beverage filter assembly cap 203 may be integrated into coffee or tea press 201 such that press 200 is an single, cohesive unit.

Figure 3A:
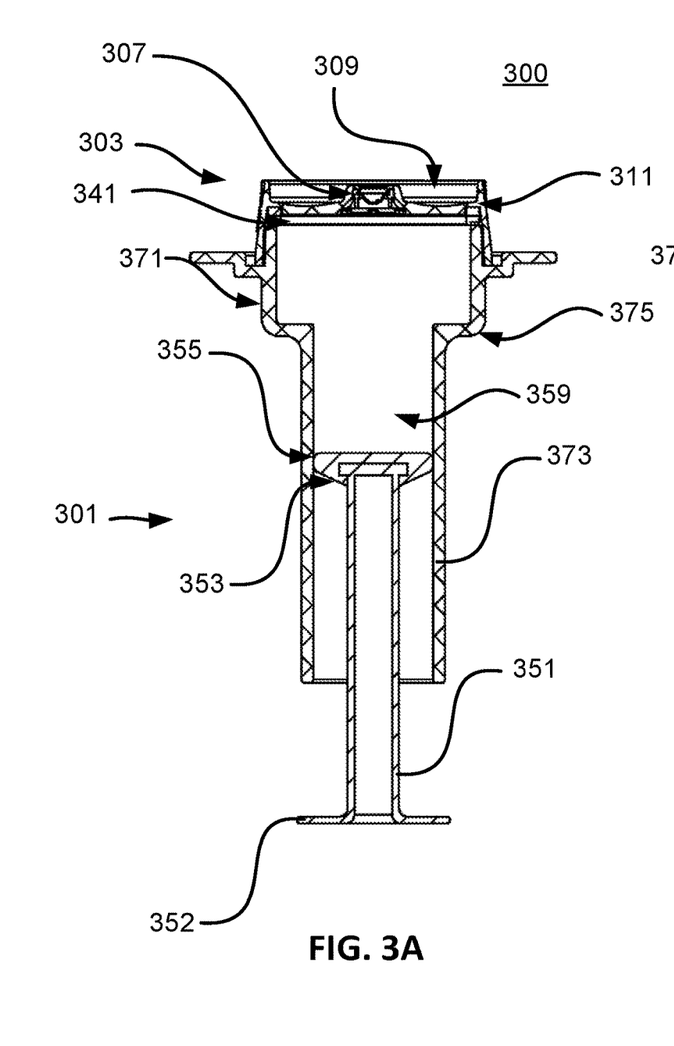
FIGS. 3A-B illustrate an infusible beverage press mated to a high-pressure beverage filter assembly according to an embodiment.
Figure 3B:
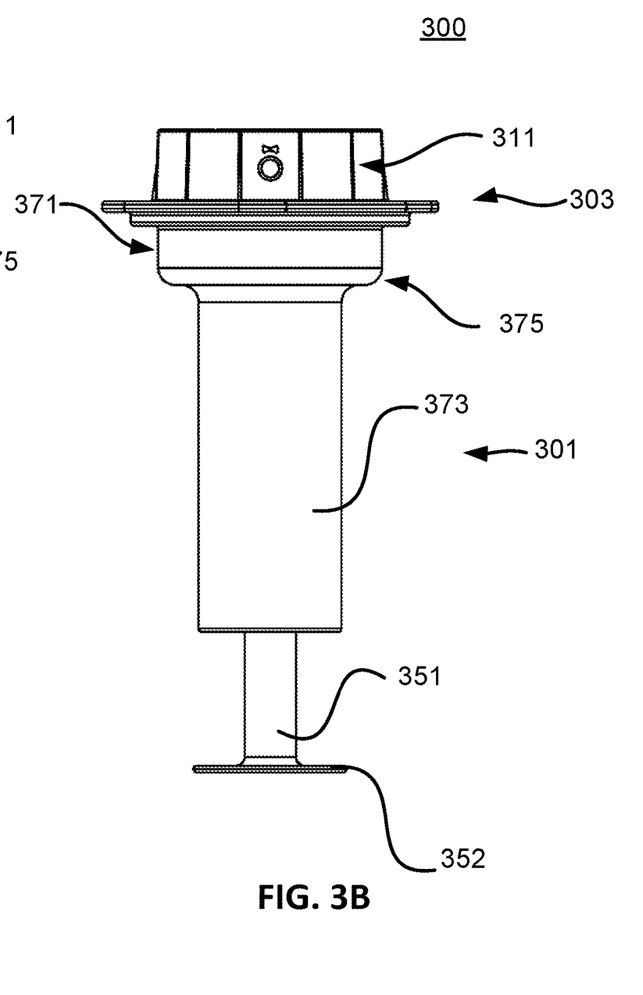

FIGS. 3A-B illustrates an infusible beverage press 301 mated to a high-pressure beverage filter assembly cap 303 according to an embodiment. FIG. 3A illustrates a cross-sectional view of the infusible beverage press 301, and FIG. 3B illustrates an external side-on view of the same infusible beverage press 301. The combination of a coffee or tea press 301 and a high-pressure beverage filter assembly cap 303 may be referred to collectively as high pressure press 300. High-pressure beverage filter assembly cap 303 may be integrated into coffee or tea press 301 such that press 300 is an single, integrated unit.

Coffee or tea press 301 includes a first cylindrical vessel 371 of a first diameter having a top and a bottom. The bottom of first cylindrical vessel 371 is attached to filter assembly 303. A removable high-pressure beverage filter assembly cap 303 encloses the bottom opening. Coffee or tea press 301 further includes a second cylindrical vessel 373 that has a diameter smaller than the first diameter of the first cylindrical vessel 371. The first cylindrical vessel 371 and second cylindrical vessel 373 are joined by a water-tight fitting 375. First cylindrical vessel 371, second cylindrical vessel 373, and water-tight fitting 375 may be separate piece joined together by water-tight joints or a single continuous, integrated unit. First cylindrical vessel 371 and second cylindrical vessel 373 may be referred to as a single vessel.

Removable high-pressure beverage filter assembly cap 303 includes a pressure-activated valve 307. Pressure-activated valve 307 is configured to remain closed while the pressure in the hollow cylinder is below a cracking pressure, and open when the pressure in the hollow cylinder rises above the cracking pressure.

A removable piston 351 is inserted into the top opening of the second cylindrical vessel 373 and pressed downward toward first cylindrical vessel 371 to force liquid 361 in the first cylindrical vessel 371 through pressure-activated valve 307 in removable high-pressure beverage filter assembly cap 303. A filter 341 may be captured between removable high-pressure beverage filter assembly cap 303 and first cylindrical vessel 371 to strain particles from the liquid.

High-pressure beverage filter assembly cap 303 has a support 311 to hold it on the mouth of an open beverage container. The support 311 may be shaped to allow venting of air out of an open beverage container when the press is resting on top of the open beverage container and liquid is entering the open beverage container during brewing. In an embodiment, support 311 includes external scallops or ridges 309 on the portion that contacts an open beverage container. These scallops or ridges 309 may also be designed to allow the press to fit on most espresso cups or inside of most coffee mugs, carafes, and Mason jars.

In operation, press 300 is placed on an open beverage container. Ground coffee, tea, or any other infusible beverage solid is put into the first cylindrical vessel 371. Hot water is added, and the mixture is stirred. Then, piston 351 is inserted into the top opening of the second cylindrical vessel 373 and pressed downward to force the hot water and beverage solid mixture through filter 341, then through pressure-activated valve 307 and into an open beverage container as high velocity stream. The piston pressurizes the air 359, above the hot water and it is this pressurized air which forces the hot water through the infusible beverage solid, through filter 341, and out through pressure-activated valve 307. After the liquid is expelled, the press 300 is then lifted off the open beverage container and the high-pressure beverage filter assembly cap 303 may be removed from coffee or tea press 301 if the two parts are separable.

Finally, piston 351 may be pressed farther to eject the spent puck of compressed beverage solid such as coffee grounds or tea leaves into a waste receptacle. The piston 351 is capped with a flexible seal 353 to engage the inside of the cylinder. In an embodiment, the seal has its maximum diameter 355 at its lowest point in order to wipe clean the inside of the cylinder when the maximum diameter is pushed fully through the cylinder with the cap removed during ejection of the spent puck.

The piston 351 has a stop 352 which limits the maximum travel of the piston but permits the maximum diameter 355 of the seal to extend beyond the bottom opening of the first cylindrical vessel 371 with the cap removed to eject the spent puck.

Some embodiments may also incorporate one or more additional pressure-release valves into the cap in the opposite orientation as the primary pressure-activated valve. That is, while the primary pressure-activated valve releases pressure from inside the brewing chamber to outside the brewing chamber, the additional pressure-release valves are configured to allow air into the pressurized chamber, between the filter and the primary pressure-activated valve to make it easier to remove the filter after use. In an example, these additional pressure-release valves may be umbrella-type valves. Some embodiments include a pressure relief valve in the plunger to allow the plunger to be pulled out with cap in place on a beverage container. Additionally, some embodiments may include features or items disposed within the brewing chamber to agitate or stir a beverage brewing mixture while brewing.

The foregoing description is merely illustrative and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. One or more steps within a method may be executed in different order (or concurrently) without altering the principles of the present disclosure.

What is claimed is:

1. A beverage press, comprising:
a vessel having top and bottom openings;

a pressurizing mechanism configured to pressurize the vessel; a removable cap that encloses the bottom opening;
    a pressure-activated valve disposed within the removable cap, wherein the pressure- activated valve is configured to be closed when the pressure in the vessel is less than a cracking pressure and open when the pressure in the vessel is greater than or equal to the cracking pressure and
    a plurality of ridges disposed on the removable cap, each respective ridge radially oriented to extend between the bottom opening and an edge of the removable cap.

2. The beverage press of claim 1, wherein a diameter of the bottom opening is larger than a diameter of the top opening.

3. The beverage press of claim 2, wherein a support is shaped to permit air to pass readily out of the beverage container when the pressurized beverage press is resting on top of the beverage container.

4. The beverage press of claim 1, wherein the pressurizing mechanism includes:
a removable air-tight piston that has an upper portion configured to be engaged by a user so that said piston, when inserted into said top opening and pressed with direct downward pressure exerted by the user, forces liquid in the vessel through pressure-activated valve.

5. The beverage press of claim 4, wherein:
the piston is capped with a flexible seal to engage the inside of the vessel; and
    the seal has its maximum diameter at its lowest point in order to wipe clean the inside of the vessel when the maximum diameter is pushed fully through the vessel with the cap removed.

6. The beverage press of claim 1, further comprising wherein each respective ridge comprises a flow channel on the inside of the removable cap which direct the flow of liquid to the pressure-activated valve.

7. The beverage press of claim 1, wherein the pressure-activated valve is a pressure-activated elastomeric dome valve.

8. The beverage press of claim 7, wherein the pressure-activated elastomeric dome valve creates a nozzle when open that directs liquid flowing through the removable cap.

9. A pressure activated filtering assembly, comprising:
a filter horizontally disposed in a filter body;
a pressure-activated valve disposed within the filter body; and
a pressurizing mechanism configured to produce a pressure on the first internal vertical side of the filter body;
the filter body with a first internal vertical side and a second external vertical side, the filter body having a plurality of internal horizontal standoff ridges, wherein each respective standoff ridge is radially oriented to extend between the pressure-activated valve and the first internal vertical side of the filter body, wherein respective portions of the filter are horizontally disposed between the standoff ridges;
the filter body further comprising a gasket between the first internal vertical side of the filter body and the filter, the gasket configured to maintain a watertight seal between the first internal vertical side of the filter body and the filter;
wherein the pressure-activated valve is configured to be closed when the pressure on the first internal vertical side of the filter body is less than a cracking pressure and open when the pressure on the first internal vertical side of the filter body is greater than or equal to the cracking pressure;
wherein the pressurizing mechanism includes:
    a vessel having top and bottom openings, wherein the bottom opening of the vessel is attached to the first internal vertical side of the filter body; and
    a removable air-tight piston configured to, when inserted into the top opening of the vessel and pressed downward toward the bottom opening of the vessel, increase pressure within the vessel.

10. The pressure-activated filtering assembly of claim 9, wherein the pressure-activated valve is a pressure-activated elastomeric dome valve.

11. A pressure-activated filtering assembly, comprising:
a filter;
a filter body with a first side and a second side, the filter body having a plurality of standoff ridges on the first side configured to maintain a minimum distance between the filter and the first side of the filter body;
a pressure-activated valve disposed within the filter body, wherein the pressure-activated valve is configured to be closed when the pressure on the first side of the filter body is less than a cracking pressure and open when the pressure on the first side of the filter body is greater than or equal to the cracking pressure;
the-pressure-activated filtering assembly further comprising:
    a first cylindrical vessel of a first diameter having a top and a bottom, wherein the bottom of the first cylindrical vessel is attached to the first side of the filter body;
    a second cylindrical vessel of a second diameter having a top and a bottom, wherein the second diameter is smaller than the first diameter, and wherein the bottom of the second cylindrical vessel is attached to the top of the first cylindrical vessel; and
    a removable air-tight piston configured to, when inserted into the top of the second cylindrical vessel and pressed downward toward the bottom of the second cylindrical vessel, increase pressure within the first cylindrical vessel and the second cylindrical vessel.

12. A method of brewing coffee, comprising:
providing a vessel including a pressure-activated elastomeric dome valve disposed on a surface of the vessel, the pressure-activated elastomeric dome valve having a characteristic cracking pressure, wherein a plurality of flow channel ridges each radially extend between the pressure-activated valve and an edge of the surface, wherein respective portions of a filter are horizontally disposed between the flow channel ridges; and
increasing the pressure inside a vessel by forcing a plunger into the vessel, the vessel containing coffee grounds and water from below the cracking pressure to above the cracking pressure;
wherein the pressure-activated elastomeric dome valve remains closed while the pressure in the vessel is below the cracking pressure, and
wherein the pressure-activated elastomeric dome valve opens in response to the pressure inside the vessel rising above the cracking pressure, allowing liquid to flow out of the vessel through the pressure-activated elastomeric dome valve.

13. The method of brewing coffee of claim 12, wherein the pressure-activated elastomeric dome valve forms a nozzle when open.

14. The method of brewing coffee of claim 12, further comprising maintaining a pressure inside the vessel above the cracking pressure until substantially all liquid has exited the vessel through the pressure-activated valve.

\* \* \* \* \*